United States Patent
Olorode et al.

(10) Patent No.: US 9,652,397 B2
(45) Date of Patent: May 16, 2017

(54) DYNAMIC POWER REDUCTION AND PERFORMANCE IMPROVEMENT IN CACHES USING FAST ACCESS

(71) Applicant: Texas Instruments Incorporated, Dallas, TX (US)

(72) Inventors: Oluleye Olorode, Pflugerville, TX (US); Mehrdad Nourani, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/694,415

(22) Filed: Apr. 23, 2015

(65) Prior Publication Data

US 2015/0309930 A1    Oct. 29, 2015

Related U.S. Application Data

(60) Provisional application No. 61/983,243, filed on Apr. 23, 2014.

(51) Int. Cl.
 *G06F 12/08* (2016.01)
 *G06F 12/0864* (2016.01)

(52) U.S. Cl.
 CPC .. *G06F 12/0864* (2013.01); *G06F 2212/1024* (2013.01); *G06F 2212/1028* (2013.01); *G06F 2212/6032* (2013.04); *Y02B 60/1225* (2013.01)

(58) Field of Classification Search
 CPC ......... G06F 12/0864; G06F 2212/1024; G06F 2212/1028; G06F 2212/6032; Y02B 60/1225
 See application file for complete search history.

(56) References Cited

U.S. PATENT DOCUMENTS

| | | | | |
|---|---|---|---|---|
| 2006/0047884 A1* | 3/2006 | Tran | ..................... | G06F 12/0864 711/128 |
| 2007/0028051 A1* | 2/2007 | Williamson | ........ | G06F 12/0864 711/128 |
| 2011/0265083 A1* | 10/2011 | Davis | .................. | G06F 12/0866 711/113 |
| 2012/0102009 A1* | 4/2012 | Peterson | ........... | G06F 17/30067 711/113 |

(Continued)

*Primary Examiner* — Aracelis Ruiz

(74) *Attorney, Agent, or Firm* — Robert D. Marshall, Jr.; Charles A. Brill; Frank D. Cimino

(57) ABSTRACT

With the increasing demand for improved processor performance, memory systems have been growing increasingly larger to keep up with this performance demand. Caches, which dictate the performance of memory systems are often the focus of improved performance in memory systems, and the most common techniques used to increase cache performance are increased size and associativity. Unfortunately, these methods yield increased static and dynamic power consumption. In this invention, a technique is shown that reduces the power consumption in associative caches with some improvement in cache performance. The architecture shown achieves these power savings by reducing the number of ways queried on each cache access, using a simple hash function and no additional storage, while skipping some pipe stages for improved performance. Up to 90% reduction in power consumption with a 4.6% performance improvement was observed.

10 Claims, 6 Drawing Sheets

(56) References Cited

U.S. PATENT DOCUMENTS

2012/0185859 A1\* 7/2012 Kashiwaya ......... G06F 9/30076
  718/100
2014/0082284 A1\* 3/2014 Abella Ferrer ..... G06F 12/0864
  711/119

\* cited by examiner

DYNAMIC POWER REDUCTION AND PERFORMANCE IMPROVEMENT IN CACHES USING FAST ACCESS

CLAIM OF PRIORITY

This application claims priority under 35 U.S.C. 119(e)(1) to U.S. Provisional Application No. 61/983,243 filed 23 Apr. 2014.

TECHNICAL FIELD OF THE INVENTION

The technical field of this invention is cache memory for data processors.

BACKGROUND OF THE INVENTION

The rapid increase in Microprocessor speeds has exceeded the rate of improvement in Dynamic Random Access Memory (DRAM) speeds in recent years. This widening performance gap between processors and memories has created several challenges for computer designers since memory performance can easily limit overall system performance. Specifically, processor performance has been observed to increase at a rate of about 60% yearly, while memory systems lag significantly behind at about 10% yearly improvement. To solve this problem, designers turn to memory performance improvements which ultimately dictate the performance and power consumption of processors. Caching is a common approach used to achieve memory system speed up, by storing data that has been recently used in a local memory. Therefore, using a larger cache could increase the access hit rate, which in turn improves processor speed but this comes with a cost—increased hardware and higher energy consumption.

As a result, there is usually a trade-off between power and performance in memory system design, since not all accessed memory locations can be stored in faster memories such as caches. Current memory systems designed with SRAMs, DRAMs and/or CAMs, have not been able to catch up with processor performance. As a result, larger caches are often employed in memory systems to bridge this memory-processor performance gap. While larger caches offer improved performance, they also increase the power consumed by the processor. An alternative to improved performance is associativity, but this also leads to increased power consumption due to parallel querying of multiple tags. This increasing cache power consumption resulting from the drive for improved performance, cannot be overlooked because caches contribute a significant fraction of the overall power consumed by modern processors. Several authors have concluded that cache/memory systems contribute 30-60% of the total power consumed by processors.

Reducing cache size in an attempt to save power is not a good option either, because it leads to higher miss rates and effectively more power consumption. As a result, attempts have been made to reduce voltages and design lower power circuits to reduce the high proportion of power consumed by caches/memory systems. However, these circuit level techniques have not been very successful; rather, power dissipation levels have steadily increased with each new microprocessor generation, leading to a renewed interest in architectural approaches that reduce the switching capacitive power component of memory systems without sacrificing performance. In an attempt to save power, some researchers have directed their architectural improvements at better performance because of the observation that improved performance (i.e. less misses) usually lead to less power consumption. Others focus on power reduction techniques targeted at specific aspects of the architecture, with some trade off in performance.

Other researchers have focused on the power consumption caused by redundant way accesses in associative caches, and developed techniques for reducing these unnecessary accesses. For example, some approaches have partitioned the data cache into sub-arrays and selected specific group(s) for access based on an algorithm, while using a level zero way cache to store the way information of recent accesses. This concept was extended to Way prediction and selective direct mapping which predicts a way for every new access prior to the cache access, instead of waiting on the tag array lookup and compare step, to provide a specific way number. While these way prediction techniques promise reduced power consumption, they all suffer from some performance degradation due to wrong way predictions which cause access repetitions.

SUMMARY OF THE INVENTION

This invention provides two simultaneous improvements in memory cache structures. First, it reduces cache power consumption by avoiding redundant reads/comparisons. Second, it increases the performance of caches by speeding up some accesses.

In conventional associative cache architectures, all cache tag ways are queried on every access and stored for comparison in the next pipe stage before a hit or miss can be determined. This lookup of multiple tags on each access is the major source of increased power consumption as cache associativity increases.

More specifically, this invention: (a) reduces the number of tags looked up per access and (b) speeds up some accesses by skipping the unnecessary tag lookup and compare stages. These two together reduce power consumption while improving cache performance.

BRIEF DESCRIPTION OF THE DRAWINGS

These and other aspects of this invention are illustrated in the drawings, in which.

DETAILED DESCRIPTION OF PREFERRED EMBODIMENTS

This invention, in general, uses a hash unit to determine the possible cache ways that could contain a tag match.

Thus, only these possible matching ways of a single set are queried on every cache access rather than all cache ways.

To achieve this, the hash value is stored (in discrete registers) of every tag on every cache allocation. This hash value uses significantly fewer bits than the full tag. The discrete register storage (hash array) enables a 0-cycle latency availability of the hash values for quick compare with the new access before a tag lookup. For the purpose of simplicity and ease of implementation, $\log_2 N$ bits (where N=associativity) is used for the hash. The power consumption achieved is very close to direct mapped cache levels, which is the lower bound in most cases.

One major advantage of hash comparison before tag access lies in the ability to avoid the need to lookup all tag ways whose hash do not match the hash of the new access. Second, if the new hash does not match any of the stored hashes in the different ways of a set, then the new access will not match any of the tag ways and therefore no tag look up or tag compare is necessary in the next stage. Such (fast) accesses skip two pipe stages, speeding up the overall execution time of applications.

The ideal number of tag ways queried on a cache access is one, which effectively gives equivalent power consumption levels to that of an equivalently sized direct mapped cache. Therefore, the most efficient hashing algorithm is one that gives the closest to one tag query per cache access. While there is a desire for associative cache power consumption levels that are close to those of direct mapped caches, the complexity and hardware cost of such logic may make it impractical to implement.

Figure 1:
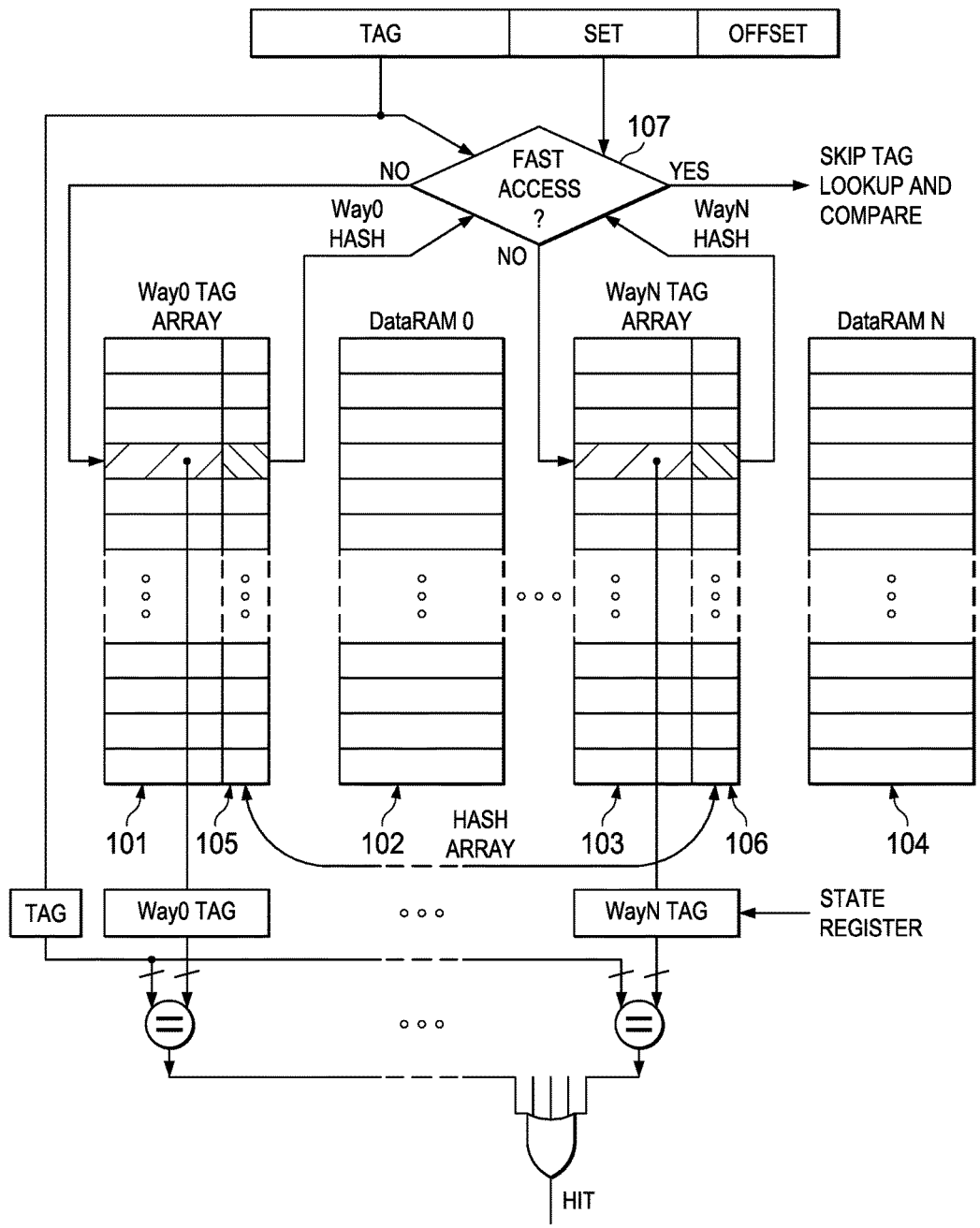
FIG. 1 illustrates an n-way Hash Cache with N-sets.

In one implementation, we use the remainder of modulo operation on the accessed tag as hash such that the hash array 105-106 shown in FIG. 1 actually replaces "n" LSBs of tag. This offers two major advantages. First, the remainder of a modulo operation on a binary value is always the last few LSBs of the original value as long as the quotient and divisor are both powers of 2. Therefore, in this implementation, we use these tag LSBs as is, without any computation to achieve the hash. This makes it easier to meet timing in high-speed architectures. Second, the hash bits do not need additional storage since they are already contained in the tag, which has to be stored regardless. As a result, rather than store all bits of tag in the tag RAM, we store the last few LSBs of the tag in discrete registers 105-106 (hash array) as the hash. This approach eliminates the need for any extra hashing logic and storage, making it cost efficient and easy to implement.

Way prediction is a technique that is capable of guessing specific way to be accessed, thereby reducing the dynamic power consumption of cache accesses, but it does not improve performance in any way. Instead, it adds extra hardware for level 0 cache storage and some performance degradation due to the possibility of access repeats on wrong predictions. As a result, a deterministic way elimination technique is presented that only eliminates ways that are guaranteed non-matches to a newly requested tag. In some cases, this technique identifies all ways of an indexed set as non-matches, leading to the concept of fast accesses where both the tag lookup and compare stages are skipped due to a miss determination in the first cycle of access. This immediately offers improved performance in addition to any of the existing replacement techniques already proposed by other researchers.

A major feature of this invention is a technique that improves memory system performance while reducing dynamic power consumption with minimal increase in hardware. This is achieved by the implementation of redundant access elimination, coupled with a multi-way prediction technique to effectively reduce the number of ways queried on every cache access. In some cases queries are reduced to a single way as in a direct-mapped cache, and in other cases all ways are eliminated leading to the concept of fast access where a cache miss is determined without querying and comparing tags. This is achieved by first, employing a hashing algorithm that eliminates specific cache ways that cannot contain the new tag to be matched. Second, the tag lookup and compare stages are skipped on accesses that are detected by the hashing algorithm to be unnecessary in all cache ways.

The development of the hash cache is based on the concept of redundant access elimination, coupled with a multi-way prediction technique, to effectively reduce the number of ways queried on every cache access. First, each cache line storage across all cache ways is assigned a set of registers for hash storage in addition to the existing tag RAM storage. Since the LSBs of cache tags are more likely to change and vary across ways, a few of the tag LSBs are used as the hash value. This hashing decision is effectively the remainder of a modulo operation on the tag value using only power of two divisors, i.e. for any binary number N, N modulo 2m is equal in value to the m least significant bits of N. As a result, this approach offers three main advantages—first, we do not need any extra logic to implement the modulo hashing algorithm. Second, the only hardware storage and power overhead due to this architecture and choice of hashing is incurred in the replacement of some of the tag RAM cells (previously used to store tag LSBs), with discrete registers. Third, the modulo hashing minimizes any architectural complexities and the eases the integration with existing cache architectures.

In order to further simplify modulo hashing in this architecture, we base our modulo divisor decisions on cache associativity, such that for any N-way cache only $\log_2 N$ LSBs of each tag RAM cells are converted to discrete registers for hash storage and tag matching. The exception to this rule is the case of direct mapped caches where N is 1 and only the tag LSB is stored as hash for way elimination.

FIG. 1 shows the hash cache architecture where a new cache access, hashes of all ways are immediately compared against the hash of the new address in 107. Since we use only very few bits for hashing, this comparison is able to fit within the first cycle of cache access, and complete before the tag query or data RAM read occurs. Only set ways whose hash value match the newly generated hash are enabled on a new access, thereby reducing the number of tags queried per access.

Non-matching ways are never queried during an access and hashes are stored during the allocate stage just as we would store tags in a conventional cache architecture. Therefore, accesses whose tag hash do not match any of the hashes stored in the different ways of the accessed set are guaranteed misses; such accesses skip the tag query and compare cache stage(s), and are referred to as fast access throughout this invention.

Due to the high spatial locality of accesses prevalent in most streaming applications the block size offsets in consecutive (streaming) accesses are only reflected in the set fields. This causes the tags to remain the same for a referenced stream while the indexed set advances incrementally. Once the set field advances to the last cache line, the next consecutive access wraps around to the first set causing the tag to increment by one. This increment in the tag field causes toggling of bits to be more pronounced in the Least Significant Bits (LSBs) of the tag and exponentially reducing as we advance towards the Most Significant Bit (MSB). For example, suppose we have a 32-bit, byte addressable machine with a 32 KB 4-Way cache and 32-byte block sizes, the different fields of the 32 bit address are derived as follows and depicted in FIG. 2.

$$CacheSize = 32\text{ KB}$$

$$BlockSize = 32\text{ bytes}$$

$$Associativity = 4$$

$$LineOffset = \log^2 Blocksize$$
$$= \log^2 32$$
$$= 5\text{ bits,}$$

$$\#cachelines\text{ per way} = \frac{Cache\ Size}{Block\ Size * Associativity}$$
$$= \frac{32\text{ KB}}{(32\text{ B} * 4)}$$
$$= 256$$

$$set\text{ bits} = \log^2 256$$
$$= 8\text{ bits}$$

Figure 2:
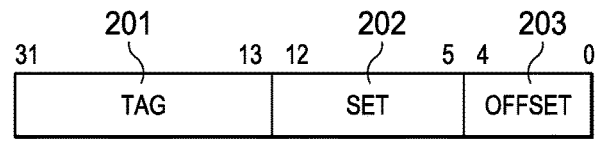
FIG. 2 illustrates a 32-bit address for a 4-Way 32 KB Cache.

Therefore, the 5 LSBs of the address represent the Offset field, the next 8 bits represent the set field and the remaining 19 bits contain the tag as shown in FIG. 2.

Now, suppose an access stream begins with address 0xF576 0000, the first access will be to set0 and tag 0x7ABB0. On the first wrap around, the stream access returns to set0 and the tag changes to 0x7ABB1, a second wrap around will change the tag to 0x7ABB2 and then to 0x7ABB3 on the third wrap around. This clearly shows that LSBs of tag fields have a higher probability of changing in applications exhibiting a high degree of spatial locality. Specifically, bit0 changes on every access to the same set after the first stream access, while bit-1 only changes on every two accesses to the same set by the same continuous access stream. Extending the pattern, bit-3 will only change after every four accesses leading to the observation that the LSB fields of tags in different ways of the same cache set tend to be different in applications exhibiting high spatial locality. This further suggests that new accesses that miss cache also have a low probability of matching any of the LSBs of tags already stored in the different ways of the referenced set. As a result, by storing very few LSBs of the tag RAM outside the tag RAM array, in discrete registers, we can quickly determine ways that can possibly match the new access just before the tag query occurs, while eliminating those that will definitely not match the new access in the tag query and compare stage. This concept of intelligently omitting cache ways that are guaranteed not to match a new access is referred to as way elimination. This technique offers two major advantages—first, dynamic power reduction due to querying fewer tags in the course of program execution. Second, accesses that do not match any of the valid tag LSBs of the ways of the referenced set, are guaranteed misses and are allowed to skip both the tag query and tag compare pipe stages of the pipeline.

To further improve the performance given by LRU in associative caches, a fast access mechanism is shown which is capable of identifying accesses that are guaranteed misses before the tag query is initiated. These fast accesses skip both the tag lookup and tag compare stages and are also applicable to direct-mapped caches. They do so by generating a new hash from the tag of a new access and compare against those stored in the hash discrete register arrays 105-106. If a hash match (HM) occurs in a specific way, the tag read from tag RAM 101-103 for that way proceeds as in a conventional cache while hash misses skip tag reads. If there are no hash matches across all cache ways as determined in 107, then the access is a guaranteed miss which skips both the tag read and compare stages (i.e. stage 1 and stage 2 respectively). This approach offers both improved cache performance and reduce reduced dynamic read energy in associative caches to conventional direct-mapped cache levels or even lower in some benchmarks since there are no tag lookups for such accesses. For cache architectures that require strict ordering, these fast accesses will only advance when there are no accesses ahead of them in the bypassed stages. The fewer accesses to tag (101-103) and data (102-104) RAM ways reduces the overall dynamic cache power consumption while the reduced latency due to fast accesses across multiple cache requests reduces the overall duration of program execution thus leading to improved average number of instructions per cycle (IPC). These performance improvements are made possible by keeping the cache hit rate the same while speeding up some of the accesses and reducing tag RAM queries.

A more detailed description of the fast access mechanism follows. This mechanism is capable of identifying accesses that are guaranteed misses in the first pipe stage. These fast accesses skip both the tag compare and data RAM read pipe stages in some cases, and are applicable to both direct-mapped and associative caches. They do so by generating anew hash from the tag of a new access and compare against those stored in the hash discrete register arrays. If a hash match (HM) occurs for a specific way, the tag compare for that way proceeds as in a conventional cache. But if there are no hash matches across all cache ways, then the access is a guaranteed miss which skips the tag compare and delayed data RAM read stages (i.e. stage 2 and stage 3 respectively).

Figure 3:
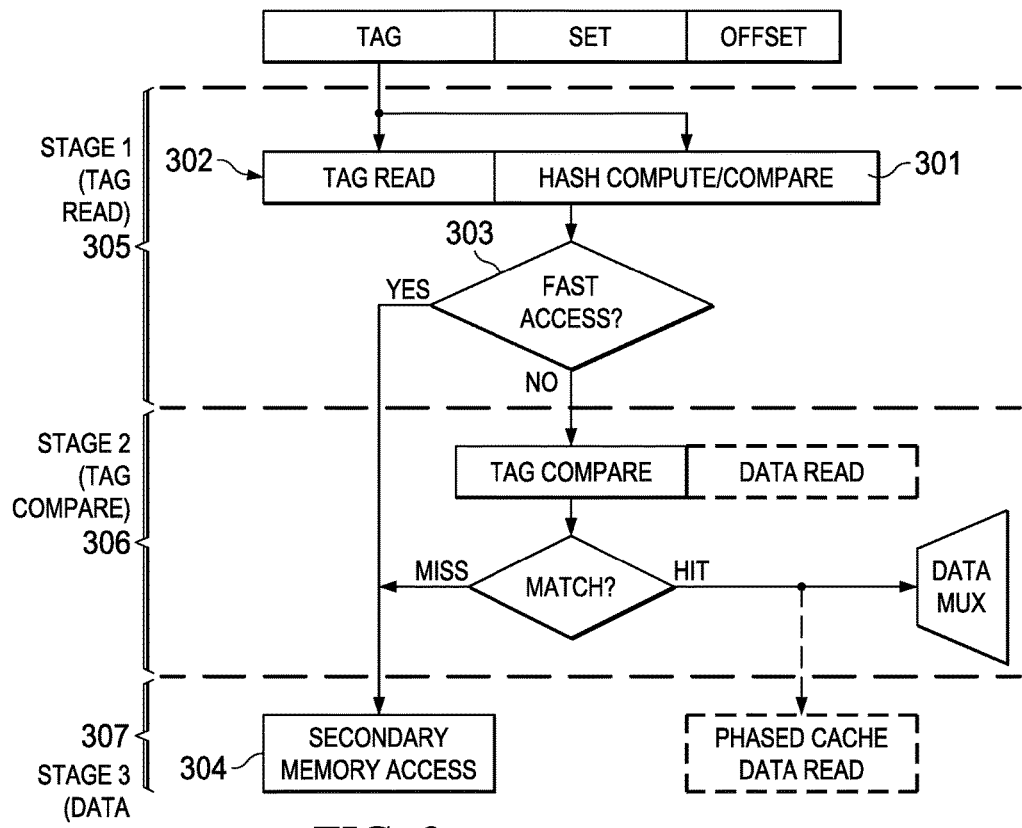
FIG. 3 illustrates the instructions per cycle improvement due to Level 1 Hash Caches for various subsets of the Spec2006 benchmarks for various number of ways.
Figure 10:
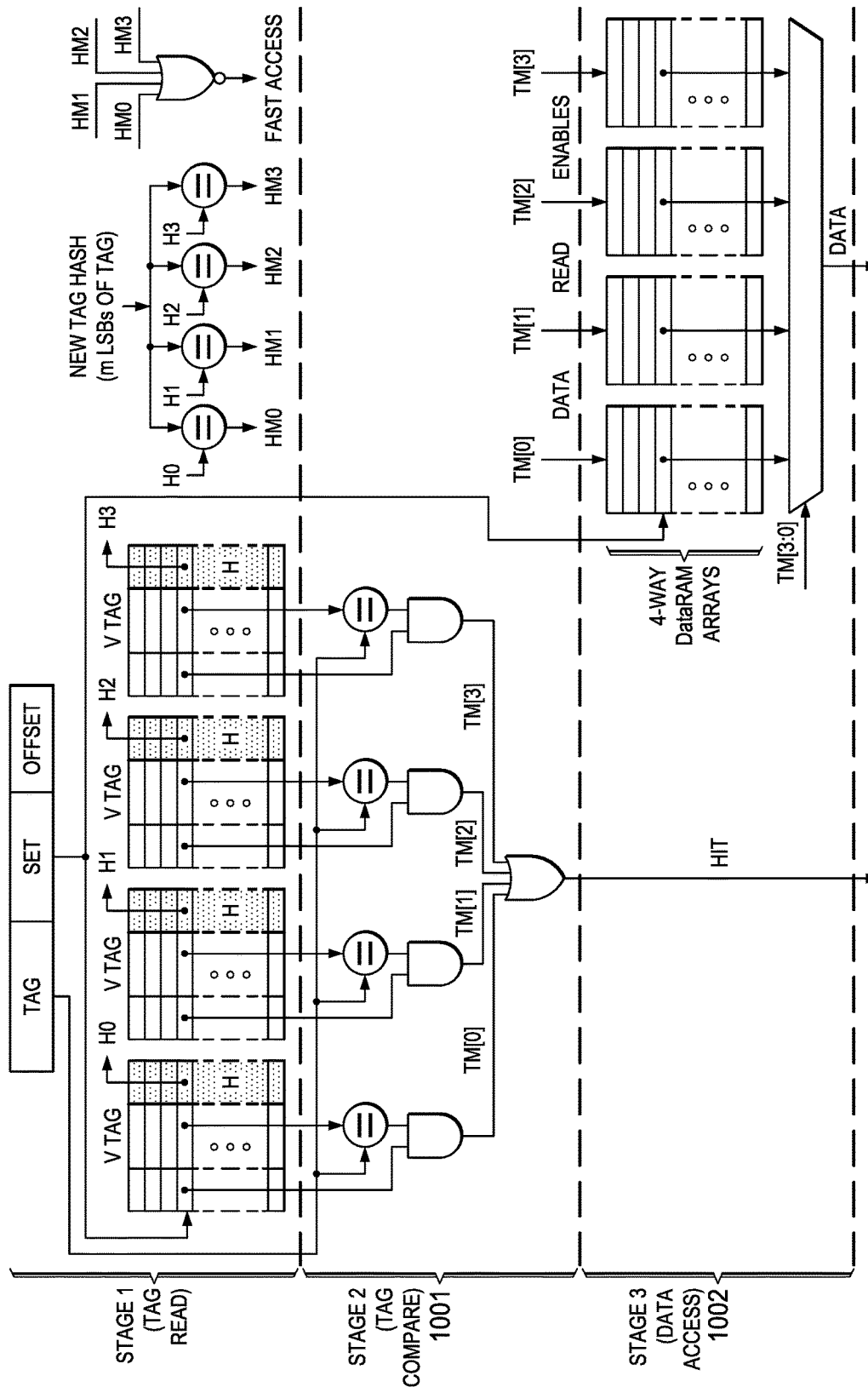
FIG. 10 shows a phased hash cache architecture.

FIG. 3 shows the hash cache concept and how it integrates with existing conventional cache architectures. A hash computation 301 and comparison 302 is done to decide ways to read, and when no hash matches 303 across all ways, the memory controller can quickly queue up the guaranteed miss request to the next memory hierarchy 304. To enable our fast access technique, data RAM read must be delayed till after the first pipe stage 305 to allow hash computation and comparison. This data RAM read occurs in the second stage 1001 for high performance architectures in parallel with tag comparison while it is further delayed to the third pipe stage 1002 for the more delay tolerant Phased Cache architecture as shown in FIG. 10. As a result, either the second pipe stage 1001 or both the second and third pipe stages 1002 are bypassed if the hash values do not match, depending on the architecture. Such fast accesses also reduce cache miss latencies leading to improved performance.

The hash cache approach therefore offers both reduced dynamic read energy and some cache performance improvement in both direct-mapped and associative caches. In some applications/benchmarks, the dynamic power reduction in associative caches yields power consumptions that are lower than in equivalently sized conventional direct-mapped caches, while maintaining the higher performance of such associative caches. For cache architectures that require strict ordering, these fast accesses will only advance when there are no accesses ahead of them in the bypassed stages.

A simple scalar toolset is used as the basis of the simulation development for performance evaluation. While there are multiple flavors and extensions of this toolset, none completely model the architectural technique proposed in this invention. Therefore, a simulator was developed using an existing simple scalar tool as basis. First, the configuration interface of the simple scalar tool was updated to handle the varying configurations required to evaluate the performance improving technique shown in this invention. Second, logic was added to determine way elimination based on tag LSBs, and also a mechanism to detect accesses that eliminate all ways for fast access. Third, a mechanism was added to skip cache pipe stages only when there are no accesses in the cache pipe stage ahead of the new access. This helps to maintain order of execution and makes it easier to compare the architecture with conventional equivalently sized architectures. Finally, we verified the functionality by comparing the access hits and misses to a conventional hit/miss profile. These where verified to be exactly the same since the technique does not alter the replacement policy in any way. This also conforms the fast cache miss detections were accurate. We also captured tag profile information for fast misses and compared against stored tags of the accessed set to verify there were no matches as expected for the specific accesses.

Table 1 gives a brief summary of the default configurations used across all of our simulations.

TABLE 1

Simulation Configuration

| Parameters | Value |
|---|---|
| Instruction Fetch Queue Size | 4 Instructions |
| Instruction Decode Width | 4 Instructions per cycle |
| Instruction Issue | 4 Instructions per cycle |
| L1 Instruction Cache Latency | 3 cycles |
| L1 Data Cache Latency | 3 cycles |
| L2 United Cache Latency | 11 cycles |
| Main Memory Latency | 26 cycles |
| TLB Miss Latency | 30 cycles |
| Memory Access Width | 32 Bytes |

For the purpose of evaluating both the performance improvement in the non-HPC hash architecture and the dynamic power reduction in our HPC hash cache architecture, we measured the dynamic power overhead due to each cache unit onSPEC2006 benchmarks, using a conventional cache configuration.

Figure 4:
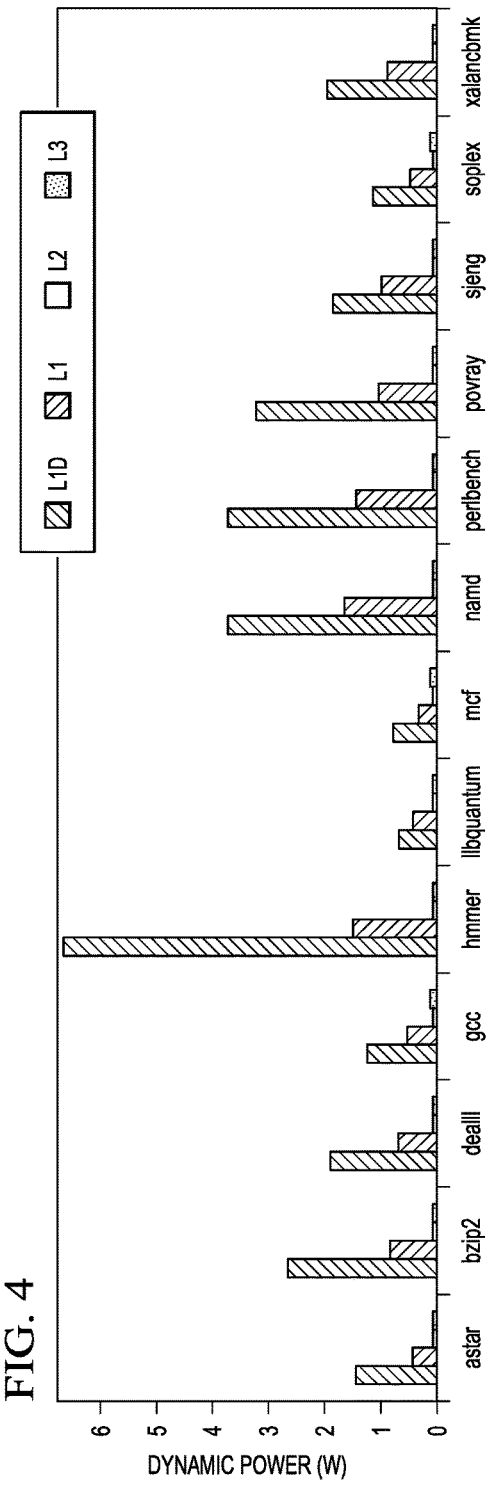
FIG. 4 illustrates the Dynamic Power Reduction in L1 Instruction cache due to Hash Caching for various subsets of the Spec2006 benchmarks for various number of ways.

The results shown in FIG. 4 along with the area and static power of each unit summarized in Table 2, gives us an idea of the overhead due to each cache unit, and guides the choice of memory units that benefit the most from our hash cache architecture. We observe that dynamic power consumption reduces dramatically as we traverse the cache hierarchies, given the number of accesses reduce significantly due to a high cache hit rate in the prior cache unit. In addition, static power increases as we traverse the cache hierarchy further from the processor due to size increments, leading to much higher area and static power overhead in L2 and L3 combined. The hash cache logic for the L2 and L3 is also much more than the L1s due to their larger sizes, but offer only a little benefit in performance improvement and dynamic power reduction. Therefore, implementing cache hashing in the L2s and L3s will only increase area and power without contributing any noticeable dynamic power improvement, even if it eliminated all the dynamic power contribution of these two memory units. As a result, we limit the hash cache implementation to the L1 caches only.

TABLE 2

Cache Power and Area Profile

| Parameter | Unit | Size | Value | Ratio (%) |
|---|---|---|---|---|
| Static Power | L1I | 32 KB | 0.367 W | 4.30 |
| | L1D | 32 KB | 0.528 W | 6.19 |
| | L2 | 256 KB | 0.834 W | 9.78 |
| | L3 | 8 MB | 6.801 W | 79.73 |
| Area | L1I | 32 KB | 3.146 mm$^2$ | 4.12 |
| | L1D | 32 KB | 6.845 mm$^2$ | 8.96 |
| | L2 | 256 KB | 4.533 mm$^2$ | 5.93 |
| | L3 | 8 MB | 61.909 mm$^2$ | 81.00 |

We evaluate the area and static power due to the proposed HPC L1 hash caches to highlight the tradeoffs involved in choosing more hash bits for improved dynamic power savings and possible performance improvement. Since data read is delayed to the 2nd pipe stage in the proposed hash architecture, there is no need to register the read data across all ways as in high performance conventional caches. For example, a conventional 32 KB L1 cache with 4 ways and 64 byte block sizes requires 64×8×4=2048 registers to store the read data in stage 1. An equivalently configured hash cache, using 1 bit hashing requires only one hash register per block (i.e. 1×32 KB/64 Byte=512 Registers). These 512 registers also replace 512 SRAM cells from the tag RAM array, and does not require the 2048 registers used by its conventional counterpart. The hash cache re-uses the comparators for comparing conventional cache tag LSBs, for hash bit comparison and only adds a register per way to save the hash match for data RAM read enables. As a result, the hash cache uses fewer SRAM and register cells in this example. The overall effect on area and static power, is summarized in Table 3 for 32 KB L1I and L1D caches with 64 byte lines, using 4-Way and 8-Way associativities respectively. As expected, the area and static power reduction due to cache hashing, fades with higher hashing bits. We evaluate the area and static (or leakage) power impact of cache hashing using 32 KB L1 caches with 64 byte blocks and 4-Way and 8-Way associativity in L1I and L1D respectively. Table 3 summarizes the results relative to the individual L1s in addition to the overall impact across all caches; i.e. the total overhead due to hash logic in the L1s divided by total overhead in L1s, L2 and L3. i HB refers to i hash bits used per cache block. For example, 2 HB refers to 2 hash bits per tag storage indexing a cache block. Negative results in HHC represent a reduction in the referenced cache metric (i.e. static power or area reduction) and are due to the pipe stage registers removed by delaying data RAM reads by a cycle in our hash cache architecture.

TABLE 3

Percentage Cache Power and Area Overhead

| | | | Overhead (%) | | | |
|---|---|---|---|---|---|---|
| Arch | Metric | Cache | 1HB | 2HB | 3HB | 4HB |
| HHC (FIG. 3) | Static Power | L1I | -0.44 | -0.38 | -0.32 | -0.25 |
| | | L1D | -0.66 | -0.62 | -0.57 | -0.53 |
| | | All | -0.06 | -0.05 | -0.05 | -0.04 |
| | Area | L1I | -0.74 | -0.63 | -0.53 | -0.42 |
| | | L1D | -0.73 | -0.68 | -0.63 | -0.58 |
| | | All | -0.10 | -0.09 | -0.08 | -0.07 |
| PHC (FIG. 5) | Static Power | L1I | 0.06 | 0.13 | 0.19 | 0.25 |
| | | L1D | 0.65 | 1.28 | 1.91 | 2.54 |
| | | All | 0.04 | 0.08 | 0.13 | 0.17 |
| | Area | L1I | 0.11 | 0.21 | 0.32 | 0.42 |

TABLE 3-continued

Percentage Cache Power and Area Overhead

| Arch | Metric | Cache | Overhead (%) | | | |
|------|--------|-------|------|------|------|------|
|      |        |       | 1HB  | 2HB  | 3HB  | 4HB  |
|      |        | L1D   | 0.05 | 0.10 | 0.15 | 0.20 |
|      |        | All   | 0.01 | 0.02 | 0.03 | 0.04 |

TABLE 4

Average Metrics Comparison on SPEC2006

| $N_{Ways}$ | Average IPC | | | Tag Access |
|---|---|---|---|---|
|   | Conv. | Hash | Change(%) | (%) |
| 1 | 1.4473 | 1.4757 | +1.96 | −0.15 |
| 2 | 1.5179 | 1.5357 | +1.17 | −28.75 |
| 4 | 1.5430 | 1.5563 | +0.86 | −60.43 |
| 8 | 1.5483 | 1.5609 | +0.81 | −79.49 |
| 16 | 1.5562 | 1.5679 | +0.75 | −89.25 |

Figure 5:
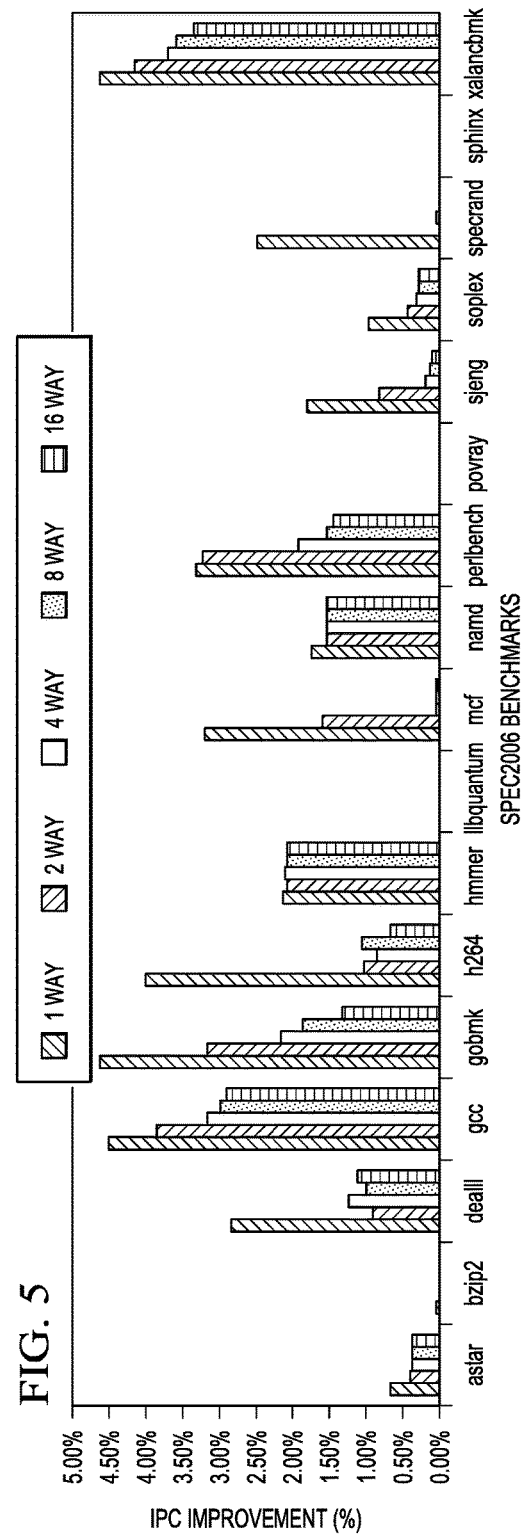
FIG. 5 illustrates Dynamic Power Reduction in L1 Data due to Hash Caching for various subsets of the Spec2006 benchmarks for various number of ways.

FIG. 5 summarizes the percentage performance improvement for direct mapped caches up to a 16-Way associativity. We used 32 KB L1 hash caches and 128 KB L2 conventional caches to isolate the performance improvement due to L1 cache hashing. The L1 caches were configured with 32-byte-block sizes while the level 2 unified cache is configured with 128-byte lines. We used LRU replacement policy for all simulations and disabled fast hit feature, which is default in the Simple scalar toolset. This feature stores the last request's information and attempts to match it with a new request for quick access. We also chose number of hash bits per cache line based on $\log_2 N$ ways where N ways is the number of ways. Our simulation results in FIG. 5, show up to 4.6% IPC improvement over an equivalent conventional cache. In four benchmarks—bzip2, libquantum, povray, sphinx, the IPC improvement is marginal due to high spatial locality, causing most tag LSBs of the same set to be different. As a result, the hash logic matches at least a way on most accesses. The rate of performance improvement over conventional caches reduces with increasing associativity because associativity already improves cache hit rate. And since our hash cache improves performance by speeding up misses, fewer misses are available for speeding up as we increase associativity. Also, more ways have to be eliminated before a fast access can occur, leading to the reduced performance improvement with increasing associativity observed in FIG. 5. This trend is observed across all SPEC2006 benchmarks. In some cases, the trend ends at a specific associativity, indicating that LRU replacement policy is at the optimum and our hashing algorithm result matches at least a way in most of the few misses left in the application. On the other hand, the number of ways eliminated from querying increases with increasing associativity since more ways become available for elimination as set associativity increases. Table 4 gives a summary of average instructions per cycle (IPC) improvement across SPEC2006 benchmarks and the associated tag array transistor overhead due to L1 caches only. We used 6-transistor SRAMs and 12-transistor discrete registers for hash storage. All other transistor counts are based on CMOS style logic.

While the IPC improvement in direct mapped cache is at 1.96%, it does not achieve the performance of an equivalently configured conventional 2-Way cache. The 2-Way hash cache gives very close performance to a 4-Way conventional cache while the 4-Way hash cache outperforms both 8-Way and 16-Way equivalently configured conventional cache. This suggests that our hash cache architecture enables using less set associative caches to achieve the performance improvement once offered by higher associativities, without incurring the increased dynamic power consumption associated with such associative caches.

One of the key advantages of the proposed hash cache architecture is its ease of integration with existing cache architectures. This is achieved by separating the hash cache logic from existing cache design with clearly defined interfaces that integrates effortlessly with existing pipe stages. The data RAM read delay is achieved by simply removing the registers previously used to store read data between the data RAM and the data multiplexers. Fast forwarding is achieved by adding a few multiplexers only in the control path since it occurs only on misses.

Figure 6:
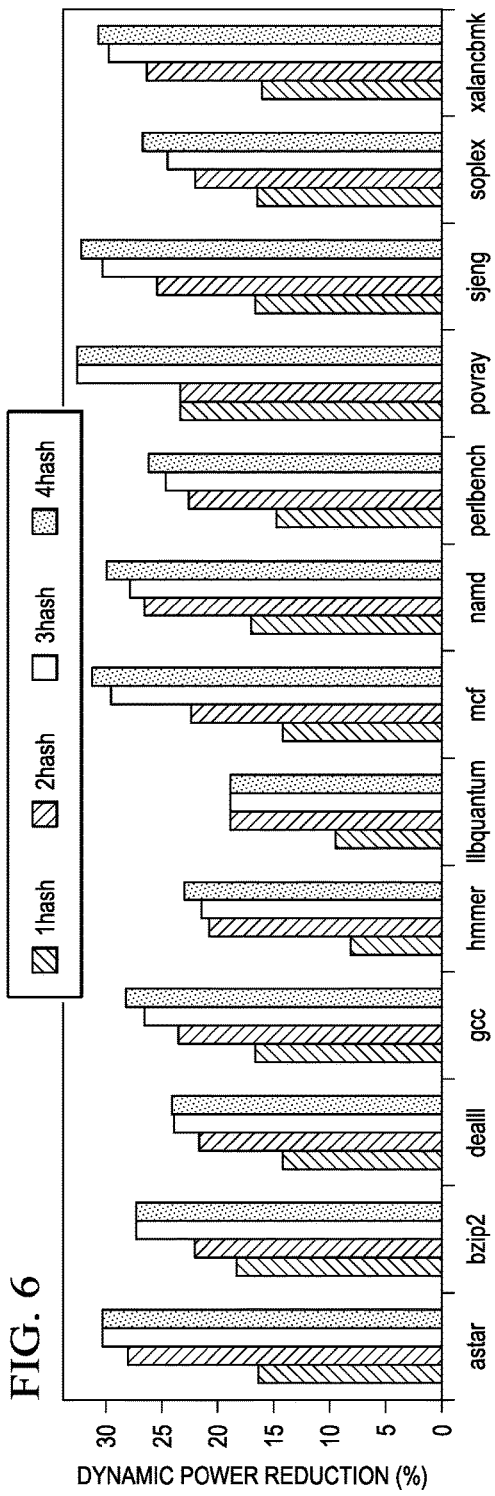
FIG. 6 illustrates the Dynamic Power Reduction in L1I cache.
Figure 7:
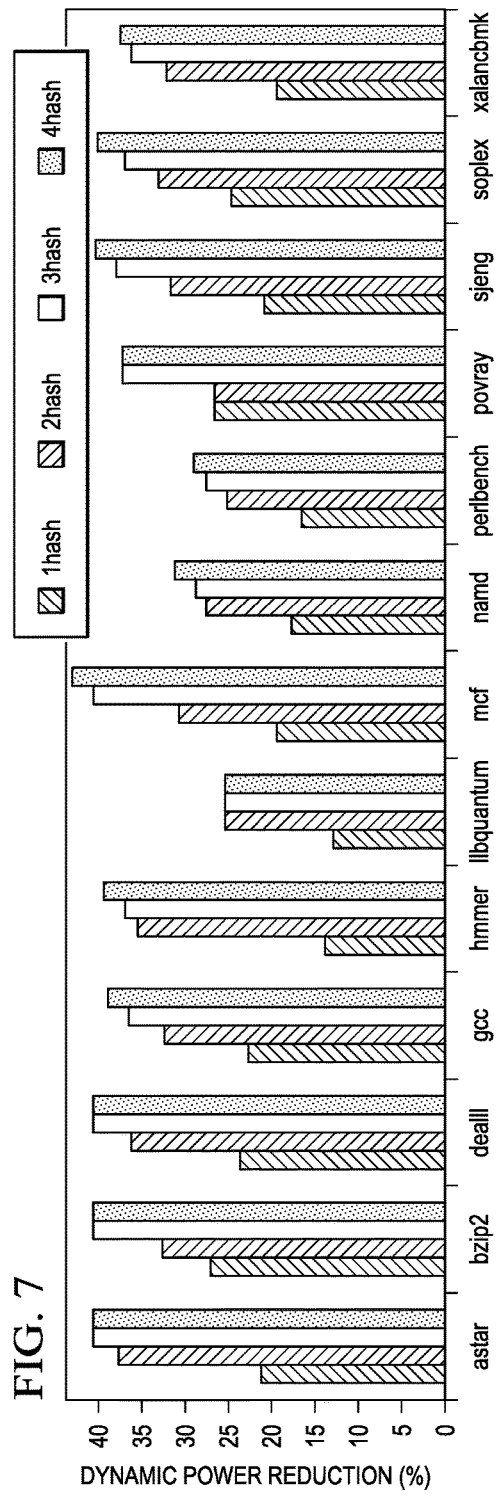
FIG. 7 shows the Dynamic Power Reduction in L1D cache.

We measured the dynamic power due to our hash cache onSPEC2006 benchmarks over 500 million instructions after fast forwarding by a billion instructions. All measurements were made using cache hashing only in the L1s, to maximize dynamic power improvement without incurring significant area and static power overhead. We kept the same cache configurations used in our area and static power evaluations, and measured dynamic power across multiple hashing bit widths using our modified Sniper simulator with MCPAT and Cacti-Ptools. The L1s used in this measurements were also configured as 2-stage pipelined to enable evaluation of cache hashing in high performance architectures. FIG. 6 and FIG. 7 show the dynamic power reduction in the L1I and L1D caches respectively, across hashing bit widths ranging from 1 through 4. As expected, the percentage of dynamic power reduction using our cache hashing technique, increases with more hash bits, but at the possible expense of area and static power overhead as previously summarized in Table 3. We observed that dynamic power savings does not improve beyond specific hashing bits for some benchmarks. For example, astar, bzip2,dealII, libquantum, and povray show that there are negligible benefits with cache hashing beyond 3-bits hashing. This is a result of the high temporal locality property exhibited by these applications, causing them to reference the same address space repeatedly during a significant portion of program execution. As a result, only very few bits of the referenced addresses by these applications, toggle beyond the 3 LSBs of tag. This indicates that a 3-bit hashing is sufficient to give optimal dynamic power savings in these applications. Similarly, the rate of increase in dynamic power savings, reduces as we approach 4-bit hashing in all applications due to both spatial and temporal locality. Spatial locality causes fewer address tag bits to toggle as we approach the tag MSBs, while temporal locality causes repeated references to these same addresses.

Figure 8:
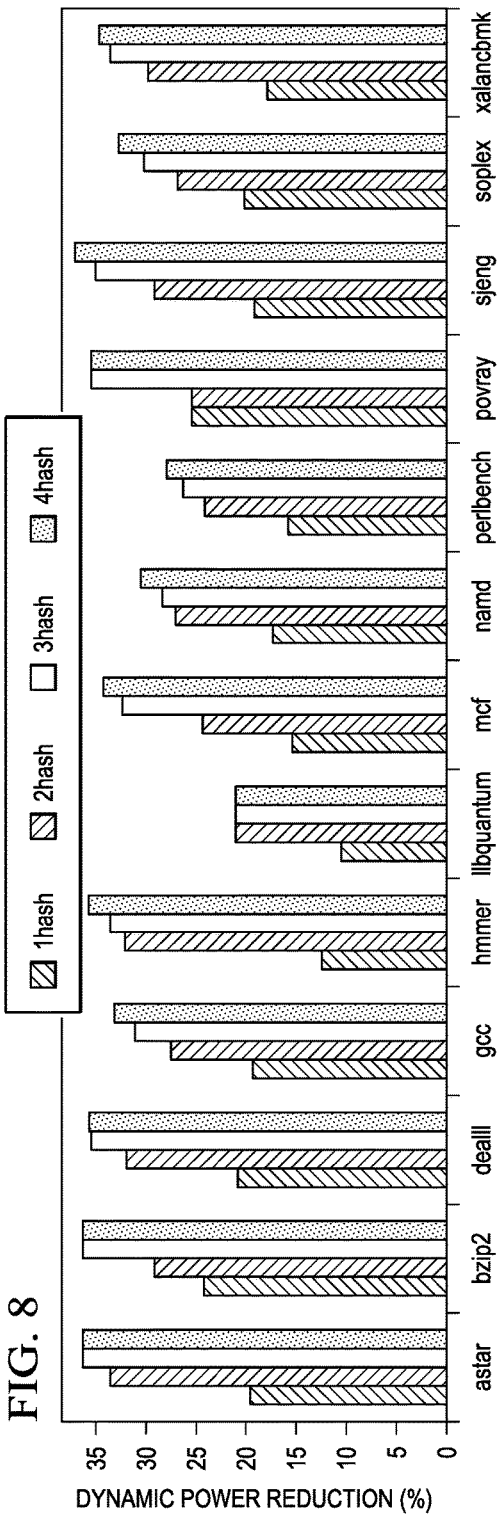
FIG. 8 shows the overall Dynamic Power Reduction using L1 hash caches.
Figure 9:
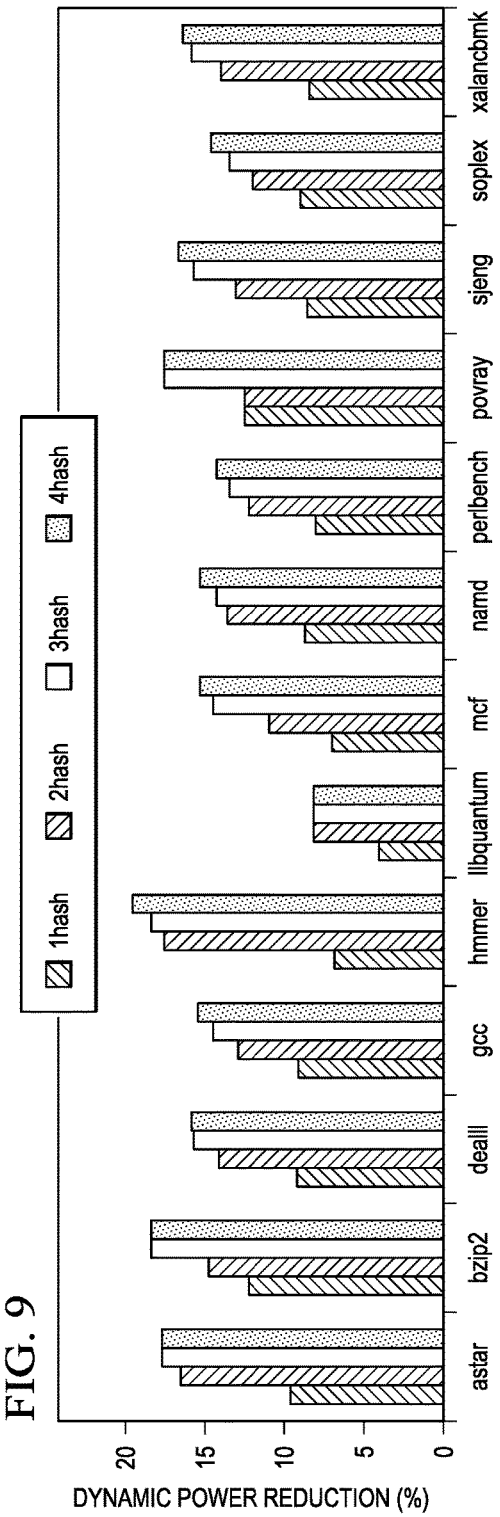
FIG. 9 shows the processor Dynamic Power Reduction using L1 hash caches.

To further evaluate the benefits of cache hashing in the L1s, we plotted the percentage dynamic power reduction in the total memory subsystem and then in the processor. The results clearly show that the dynamic power savings due to L1 hash caches is still significant even when evaluated within the overall larger memory subsystem and processor. FIG. 8 gives the percentage dynamic power reduction when evaluated within the over memory subsystem i.e. including L1s, L2 and L3 memory systems while FIG. 9 gives the dynamic power reduction within the processor as a whole.

What is claimed is:

1. A cache memory system, comprising:
a cache memory operable to store data in a plurality of locations defined by a plurality of addresses and divided into a plurality of N cache ways;
a processing block operable to compute a hash value from each of said addresses, the number of bits used for each hash value is $\log_2 N$;
a register bank associated with each cache way, operable to store said hash values together with said addresses being stored in a tag ram; and
a processing block operable to compare the hash value of the address of a new memory access request with the plurality of hash values stored in said plurality of register banks.

2. The cache memory system of claim 1, wherein:
said hash values are formed from some of the least significant bits of said addresses.

3. The cache memory system of claim 1, wherein:
said cache memory system is operable to read data and tag information requested by a memory access request from the cache memory only when the hash value computed from the address of the memory request matches one of the hash entries saved in one of the said register banks.

4. The cache memory system of claim 1, wherein:
said cache memory system is operable to bypass tag and data ram reads when there is no match between the hash value computed from the requested memory address and any of the hash values stored in any of the register banks referenced by the requested memory address.

5. The cache memory system of claim 1, further comprising:
an MRU register bank operable to store a plurality of the Most Recently Used tag ram entries and the corresponding hash values; and
a processing block operable to compare the hash value of the address of a new memory access request with the plurality of hash values stored in said MRU register bank, and bypassing tag and data ram reads if there is no match.

6. A method of memory access comprising the steps of:
storing a plurality of data values in a plurality of storage locations identified by a plurality of addresses within an associative cache memory system comprising of a plurality of N ways;
computing a plurality of hash values from said plurality of addresses, the number of bits used for each hash value is $\log_2 N$;
storing the plurality of computed hash values in one of a plurality of register banks together with said addresses being stored in a corresponding tag ram;
comparing the hash value computed from the address of a new memory access request with the plurality of hash values stored in said register banks.

7. The method of claim 6, wherein:
said hash values are formed from some of the least significant bits of said addresses.

8. The method of claim 6, further comprising the step of:
bypassing tag and data ram reads when there is no match between the hash value computed from the requested memory address and any of the hash values stored in any of the register banks.

9. The method of claim 6, further comprising the step of:
reading data and tag information requested by a memory access request from the cache memory only when the hash value computed from the address of the memory request matches one of the hash entries saved in one of the said register banks.

10. The method of claim 6, further comprising the steps of:
storing a plurality of the Most Recently Used tag ram entries and the corresponding hash values in a MRU register bank;
comparing the hash value of the address of a new memory access request with the plurality of hash values stored in the MRU register bank; and
bypassing tag and data ram reads if there is no match.

* * * * *